United States Patent [19]
Pollard

[11] 4,191,476
[45] Mar. 4, 1980

[54] OPTICAL INSPECTION
[75] Inventor: Harry C. Pollard, Leicester, England
[73] Assignee: National Research Development Corporation, London, England
[21] Appl. No.: 886,130
[22] Filed: Mar. 13, 1978
[30] Foreign Application Priority Data
Mar. 15, 1977 [GB] United Kingdom ............... 10884/77
[51] Int. Cl.² .............................................. G01B 9/02
[52] U.S. Cl. ..................................... 356/349; 356/360
[58] Field of Search ................ 356/347, 349, 359, 360
[56] References Cited
U.S. PATENT DOCUMENTS
3,816,649  6/1974  Butters et al. ......................... 178/6.8
4,018,531  4/1977  Leendertz ............................ 356/360
FOREIGN PATENT DOCUMENTS
1382523  2/1975  United Kingdom ..................... 356/347

OTHER PUBLICATIONS
Butters et al., "Speckle Patterns," Physics Bulletin, vol. 23, p. 17, 1972.

Primary Examiner—John K. Corbin
Assistant Examiner—Matthew W. Koren
Attorney, Agent, or Firm—Cushman, Darby & Cushman

[57] ABSTRACT

In a method of optical inspection of a surface, two patterns of illumination are formed independently on a photosensitive screen respectively by means of light of two different wavelengths. The patterns are formed in the same manner and each results from irradiation of the screen with light derived from a coherent source and consisting of two interfering beams, one of which is constituted by light scattered from the surface under inspection and imaged on to the screen. A video signal is derived from the screen representing the spatial variations in the sum of the intensities in the two patterns.

14 Claims, 4 Drawing Figures

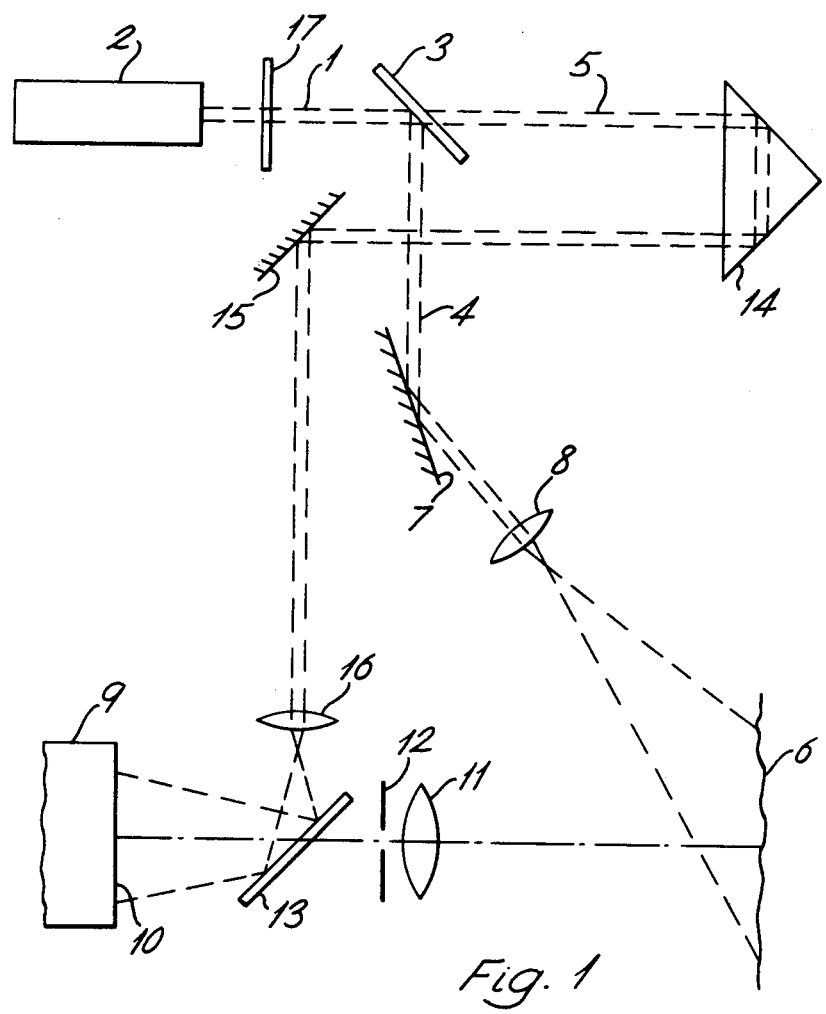
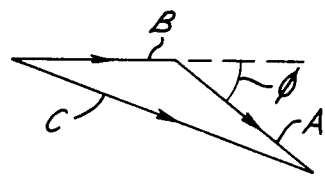
Fig. 1
Fig. 2

OPTICAL INSPECTION

This invention relates to optical inspection, and is concerned in particular with systems employing the techniques of electronic speckle pattern interferometry. Such techniques are described for example by Butters, Leendertz and Denby in Physics Bulletin, Vol. 23 (1972), page 17, and details of some systems employing them are disclosed in British patent specifications Nos. 1,392,448 and 1,460,861.

In certain applications of electronic speckle pattern interferometry it is required to make a comparison between video signals respectively representing two speckle patterns formed respectively by means of light of two different wavelengths, and hitherto this has been effected by using electronic subtraction techniques. While satisfactory results may readily be obtained in this way, it does have certain disadvantages. Thus in some cases the two speckle patterns are formed at different times, and it is then necessary to provide a sophisticated form of memory device for storing at least one of the video signals; this entails considerable expense, because the memory device is required to match the television camera used for deriving the video signals in respect of image resolution. In other cases, where the two speckle patterns can be formed simultaneously, no memory device is required but it is instead necessary to provide in the television camera two separate photosensitive devices for respectively deriving the video signals to be compared; this again involves considerable expense because of the need for careful matching of the characteristics and operating conditions of the two photosensitive devices. Moreover, in both types of case the arrangement is sensitive to instability in the camera or the memory device (where this is used), which effectively results in decorrelation between the two speckle patterns.

It is accordingly an object of the present invention to provide systems of a kind such that these disadvantages are avoided or alleviated.

According to one aspect of the invention, a method of optical inspection of a surface comprises deriving from a photosensitive screen a video signal representing the spatial variations in the sum of the intensities in two patterns of illumination formed independently on the screen respectively by means of light of two different wavelengths, said patterns being formed in the same manner and each of them resulting from the irradiation of the screen with light derived from a coherent source and consisting of first and second interfering beams, the first beam for each pattern being constituted by light scattered from said surface and imaged on to said screen.

It is to be understood that in this specification the term light includes ultra-violet and infra-red radiation as well as visible radiation.

As will be explained in more detail below, the video signal derived in a method according to the invention contains information relating to the surface under inspection which is equivalent to that obtainable by subtraction of two video signals respectively representing the spatial variations of intensity in the two patterns of illumination; this information can be extracted, in a form suitable for generating a television picture displaying a fringe pattern similar to that obtainable by the subtraction method, by processing the video signal to remove its d.c. component (for example by passing the signal through a band-pass or high-pass filter) and then rectifying the resultant to provide a unidirectional signal.

In one type of method according to the invention, the second beam for each pattern of illumination is arranged to have a smooth wavefront, in which case the lines of the fringe pattern obtainable represent contours of constant displacement of points on the surface under inspection from a notional surface having a form determined by the actual form of the illumination of the surface, the contour interval being inversely proportional to the difference between the two wavelengths. In this type of method, it is preferred that the form of the wavefront of the second beam for each pattern of illumination should be such that at every point in the pattern the maximum angle between a ray of the first beam and a ray of the second beam is not greater than the maximum angle between rays of the first beam; the optimum conditions in this respect are obtained if the second beam diverges from an effective point source disposed at a position optically equivalent to the centre of the aperture of the optical system used for imaging the light of the first beam. The use of such a form for the second beam ensures that the range of spatial frequencies in the pattern of illumination formed on the screen, which exhibits the "speckle effect" because it is partly formed by the imaging of scattered light derived from a coherent source, will not extend materially beyond the range of spatial frequencies in the speckle pattern that would result from irradiation of the screen with only the light of the first beam. This latter range is of course dependent on the size of the aperture of the optical system used for imaging the light of the first beam on to the screen, and to achieve high efficiency in use of the available illumination this aperture should be made sufficiently small to ensure that the spatial frequencies in the pattern of illumination formed on the screen lie wholly or mainly within the range which can be resolved by the arrangement used for deriving the video signal from the screen.

In another type of method according to the invention, the second beam for each pattern of illumination is constituted by light scattered from a surface different from, but having a similar form to, the surface under inspection and imaged on to the photosensitive screen in the same manner as for the first beam. The lines of the fringe pattern obtainable in this case represent contours of constant discrepancy between the two surfaces at corresponding points of the surfaces, the contour interval being inversely proportional to the difference between the two wavelengths. Since the scattered light is imaged in the same manner for the two beams, the interference between the beams will not result in a material extension of the range of spatial frequencies in the overall pattern of illumination beyond that pertaining to the speckle pattern which would be formed by either of the beams alone. In this respect, of course, similar considerations to those discussed above apply in relation to the choice of the aperture of the optical system used for imaging the scattered light.

The independence of the two patterns of illumination may be achieved simply by arranging for them to be formed successively on the photosensitive screen, in which case it is required that the screen should have an integrating characteristic in respect of incident light. This requirement can be dispensed with if the two patterns of illumination are formed on the screen simultaneously instead of successively, but in this case it is necessary to ensure that there is no interference at the screen between the light by means of which one pattern is formed and the light by means of which the other pattern is formed; this condition can be met either by choosing sufficiently different values for the two wavelengths or by using different polarisation conditions for the light in respect of the two patterns.

The photosensitive screen used in a method according to the invention will commonly be emodied in a television camera tube such as a vidicon tube. In a typical example, such a tube might have a screen with an active area having a diameter of the order of two cms. and be capable of resolving 600 picture lines; in this case an aperture of f/16 may suitably be used.

According to another aspect of the invention, there is provided an apparatus for use in optical inspection, comprising a television camera device incorporating a photosensitive screen, an optical system for imaging on to said screen light from surfaces viewed by the camera device, means for causing, in respect of a surface viewed by the camera device, the formation independently on said screen, respectively by means of light of two different wavelengths, of two patterns of illumination which are formed in the same manner and each of which results from the irradiation of the screen with light derived from a coherent source and consisting of first and second interfering beams, the first beam for each pattern being constituted by light scattered from said surface and imaged on to said screen by said optical system, and means for operating the camera device to derive a video signal representing the spatial variations in the sum of the intensities in the two patterns of illumination.

The invention will be further explained and described with reference to the accompanying drawings, in which:

FIG. 1 is a diagram illustrating the layout of a simple form of interferometer for use in electronic speckle pattern interferometry;

FIG. 2 is an explanatory diagram;

Figure 3:
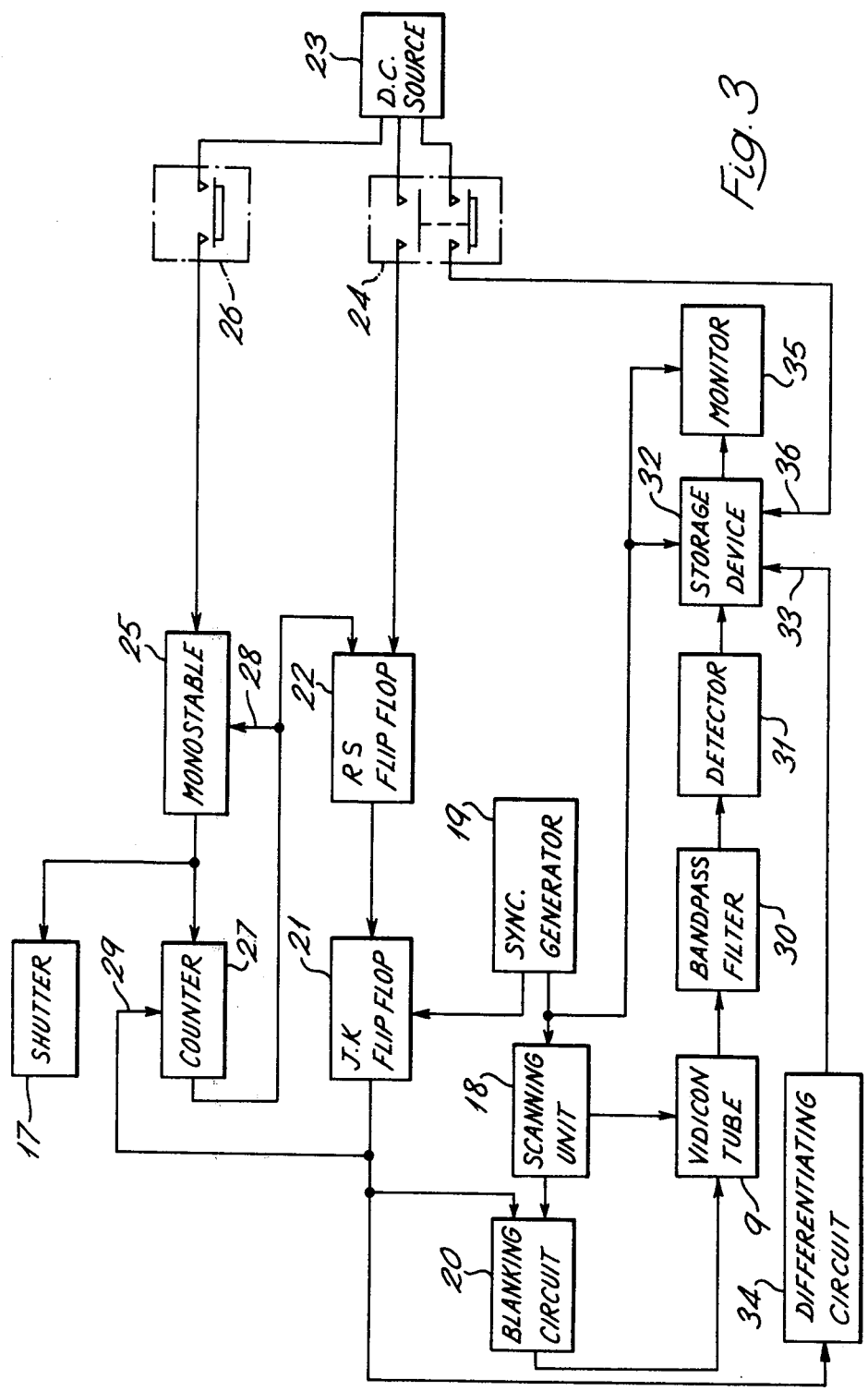
FIG. 3 is a diagram illustrating a television system designed for use in a method according to the invention.

In the interferometer shown in FIG. 1, a collimated beam 1 of monochromatic light is produced by a coherent source 2 and is split by means of a beam splitter 3 into an object beam 4 and a reference beam 5. The beam 4 is arranged to illuminate a surface 6 undergoing inspection, the beam 4 being deviated by a mirror 7 and then being converted by means of a lens 8 into a divergent form with a spherical wavefront. The surface 6 is viewed by a vidicon tube 9 having a photosensitive screen 10, light scattered from the surface 6 being imaged on the screen 10 by an optical system comprising a lens 11 and an aperture stop 12. The imaged light is transmitted through a beam combining device 13 which serves to reflect the reference beam 5 on to the screen 10, the beam 5 previously having been deviated by means of a prismatic reflector 14 and a mirror 15 and having been converted by means of a lens 16 into a divergent form with a spherical wavefront. The convoluted path followed by the beam 5 is chosen so that at the screen 10 the path lengths for the light from the beams 4 and 5 will be substantially equal. The position of the lens 16 is chosen so that the point from which the beam 5 diverges is located at a position optically equivalent to the centre of the aperture of the stop 12, the size of this aperture being chosen, having regard to the resolving power of the tube 9, so as appropriately to restrict the range of spatial frequencies in the speckle pattern that would result from illumination of the screen 10 with only the light scattered from the surface 6. This light of course interferes at the screen 10 with the light of the reference beam 5, to produce a resultant pattern of illumination which is itself in the form of a speckle pattern. The duration of the exposure of the screen 10 to any particular pattern of illumination can be controlled by means of an electrically operable shutter 17 disposed in the path of the beam 1. It will of course normally be desirable to provide suitable screening to prevent unwanted light reaching the screen 10; this is not shown in the drawing, but appropriate arrangements will be readily apparent to those skilled in the art.

It should be noted that the layout of the interferometer shown in FIG. 1 is basically the same as that of the arrangement illustrated in FIG. 2 of British patent specification No. 1,392,448. If the source 2 is chosen to be adjustable so that the wavelength of the beam 1 can be set at either of two values such that the output power is substantially the same for both wavelengths, such an interferometer can be used in methods of electronic speckle pattern interferometry by means of which the form of the surface 6 can be inspected, in relation to the form of the wavefront of the object beam 4, by arranging for two patterns of illumination to be formed successively on the screen 10, respectively by means of light of the two wavelengths, without any change of the surface 6 taking place; a suitable arrangement in such cases is to use an argon laser for the source 2, with the wavelengths being 496.5 and 488 nanometers. Consideration will now be given to certain aspects of such methods, but it should be noted that the application of the principles involved is not restricted to the use of interferometers of the specific form shown in FIG. 1. For example the discussion would be equally applicable to the use of an interferometer having a layout such as is illustrated in FIG. 1 of British patent specification No. 1,460,861, which may in practice be preferred in order to arrange for the illumination of a surface under inspection to be incident substantially normal to the surface.

Consider firstly for one wavelength the speckle pattern that would be formed on the screen 10 in the absence of the reference beam 5. This pattern contains information about the position of the surface 6 relative to the illuminating wavefront of the beam 4. This information is effectively conveyed by the phase of each speckle, which changes if there is a change in wavelength; for small wavelength changes, however, the intensity, distribution and size of the speckles remain substantially constant. By virtue of interference at the screen 10 between the light of the reference beam 5 and the light scattered from the surface 6, phase variations in the original speckle pattern are converted into intensity variations in the resultant pattern of illumination formed on the screen 10, so that a video signal generated by the tube 9 will contain information related to the positional information in the original speckle pattern. This can be illustrated by reference to the simple vector diagram in FIG. 2, in which the vectors A and B respectively represent, in amplitude and phase, a particular speckle in the original pattern and the wavefront of the reference beam 5 at a corresponding point. The resultant vector C thus represents, in amplitude and phase, the corresponding speckle in the resultant pattern of illumination; the intensity I for this speckle is given by the square of the magnitude of the vector C, hence $$I = R^2 + S^2 + 2RS \cos \phi$$

where R and S are the magnitudes of the vectors B and A respectively, and $\phi$ is the phase difference between them. A video signal representing the spatial variations of I will have a unidirectional component corresponding to the terms $R^2$ and $S^2$ and an alternating component corresponding to the term $2RS \cos \phi$, the frequency range of the latter component corresponding to the range of spatial frequencies in the speckle pattern.

For small wavelength changes, the relative phase angle $\phi$ will change, causing the speckle intensity I in the resultant pattern to change, with the values of R and S remaining sensibly constant. Using the suffixes 1 and 2 to denote the values of the relevant parameters respectively for the two wavelengths used for forming the patterns of illumination on the screen 10, we have $$I_1 = R^2 + S^2 + 2RS \cos \phi_1$$

$$I_2 = R^2 + S^2 + 2RS \cos \phi_2, \text{ and hence}$$

$$I_1 - I_2 = 2RS(\cos \phi_1 - \cos \phi_2).$$

It will be appreciated that the intensity difference $(I_1 - I_2)$ is zero whenever the relative phase change $(\phi_1 - \phi_2)$, which is subsequently denoted by $\theta$, has a value of zero or $2N\pi$ radians, where N is an integer. This condition will be satisfied for points for which the displacement between the surface 6 and a notional surface, having a form determined by the shape of the illuminating wavefront of the beam 4, is zero or $N\lambda_1\lambda_2/2(\lambda_1 - \lambda_2)$, where $\lambda_1$ and $\lambda_2$ are the two wavelengths used.

In known methods of the kind presently under consideration, the normal practice would be to use the vidicon tube 9 to generate successively two video signals respectively representing the spatial variations of $I_1$ and $I_2$ and to apply these signals to a subtraction circuit to derive a signal representing the spatial variations of $(I_1 - I_2)$; at least the first of the video signals must of course be recorded without a significant loss of resolution to enable the subtraction process to be effected. The result of the subtraction process is an alternating signal whose strength varies in accordance with variations in $\theta$, being zero an instants corresponding to points on the surface 6 for which $\theta$ has a value of zero or $2N\pi$ radians and being a maximum at instants corresponding to points on the surface 6 for which $\theta$ has a value of $(2N-1)\pi$ radians. This signal may be used to generate a television picture, usually after having been subjected to full wave rectification, the picture having a speckled appearance and exhibiting a fringe pattern consisting of light and dark areas; the dark lines in this pattern are readily interpretable as a form or contour map.

In methods according to the invention, on the other hand, the vidicon tube 9 is operated so as to generate a single video signal representing the spatial variations of the sum $(I_1 + I_2)$. How this is done will be described below, but it is first appropriate to consider the properties of such a signal and the way in which it can be used. From the equations set out above it will be seen that $$I_1 + I_2 = 2(R^2 + S^2) + 2RS(\cos \phi_1 + \cos \phi_2).$$

The single video signal generated by the tube 9 will thus have a unidirectional component corresponding to the term $2(R^2 + S^2)$ and an alternating component corresponding to the term $2RS(\cos \phi_1 + \cos \phi_2)$. The strength of the alternating component will vary in accordance with variations in $\theta$, being zero at instants corresponding to points on the surface 6 for which $\theta$ has a value of $(2N-1)\pi$ radians, and being a maximum at instants corresponding to points on the surface 6 for which $\theta$ has a value of zero or $2N\pi$ radians, i.e. the converse of the case for the difference signal derived using the subtraction process. Thus, by processing the single video signal to remove the unidirectional component, one can derive an alternating signal which can be used to generate a television picture having a form similar to that of the picture which could be generated using a corresponding difference signal, but with the dark lines of the fringe pattern shifted by an amount corresponding to a change in $\theta$ of $\pi$ radians.

In theory the fringe contrast should be similar for the subtraction and addition techniques. In practice, however, an important consideration in respect of the subtraction technique is the possibility of instability in the electronic system, which results in imperfect temporal matching between the two video signals and hence a degradation of the fringe contrast. This consideration does not arise in the case of methods according to the invention, where the only relevant factor (which also applies in the case of the subtraction technique) is the spatial matching between the two patterns of illumination; this is of course dependent only on the mechanical stability of the interferometer. It may be noted here that, for both subtraction and addition techniques, it can be deduced from the first equation set out above that the maximum efficiency of the phase/intensity conversion will occur when the ratio R/S has a value of unity; this condition is an ideal one yielding the highest signal to noise ratio. In the original speckle pattern, however, the value of S will vary spatially; thus the ratio R/S cannot have the optimum value for all speckles, since R does not vary significantly. In practice it is found that the maximum fringe contrast occurs when the reference intensity is made somewhat greater than the average speckle intensity.

Reverting now to the generation of the single video signal by the vidicon tube 9 in a method according to the invention when using an interferometer as shown in FIG. 1, this requires the operation of the tube 9 to be changed from the normal mode in which the screen 10 is scanned in a conventional raster on a continuous basis. Instead, scanning of the screen 10 is inhibited (for example by biassing the electron gun of the tube 9 beyond cut-off) for the whole of the period from the beginning of the exposure for the first pattern of illumination to the end of the exposure for the second pattern of illumination. The required signal can then be derived by restarting the scanning of the screen 10; depending on the precise operating conditions of the tube 9, a usable signal is obtainable either from the first frame scan or from a sequence of several successive frame scans. It will be appreciated that this method utilises the integrating characteristic of the screen 10 in respect of incident light, and that a significant practical factor is the capacity of the screen 10 to retain information corresponding to a particular pattern of illumination, since this will impose an upper limit on the permissible length of the interval between the two exposures. In this respect it has been found particularly useful to employ a vidicon tube of the Type No. 4542 supplied by Radio Corporation of America, in which case satisfactory results can be obtained with intervals between the two exposures up to the order of one minute in duration. This of course provides adequate time for the necessary change of wavelength to be made, either manually or automatically. For certain types of vidicon tube conventionally used in closed circuit television systems, however, the interval between the two exposures must be made much shorter (say of the order of 100 milliseconds), and it will then normally be necessary for the change to be timed automatically in relation to the making of the two exposures, which will themselves typically have a duration of a few milliseconds.

Where, as will normally be the case, it is required to provide for extended time viewing of a television picture generated by means of the single video signal derived from the tube 9, special measures will of course be necessary to take account of the fact that this signal is available for only a short period. One possibility is to use a monitor incorporating a cathode ray tube having a long persistence screen, but it will usually be preferred to use a conventional monitor and to operate this from a stored version of the picture signal derived by filtering and rectification of the original video signal. It should be emphasised that for this purpose it is unnecessary to use a sophisticated or expensive type of storage device, since this device is not required to match the vidicon tube 9 in resolution and it is not necessary for its operation to be synchronised with more than conventional accuracy with that of the tube 9.

In FIG. 3 there is illustrated diagrammatically a television system suitable for use in a method in accordance with the invention in conjunction with an interferometer as shown in FIG. 1 in which the source 2 is adjustable as specified above and the vidicon tube 9 is of the specific Type referred to above. Associated with the tube 9 is a scanning unit 18, which effects scanning of the screen 10 in conventional manner under the control of frame and line synchronising signals produced by a generator 19. Also associated with the tube 9 is a conventional blanking circuit 20, which is operative to bias the electron gun of the tube 9 beyond cut-off; as is normal the circuit 20 is operated under the control of the unit 18 to cut off the electron beam of the tube 9 during the flyback periods of the scan. The circuit 20 is also operable by means of an output derived from a JK flipflop 21, which is clocked by the frame synchronising signals produced by the generator 19. The input of the flipflop 21 is connected to the output of an RS flipflop 22 whose "set" input is connectible to a d.c. source 23 by means of a pair of contacts of a switch 24; the switch 24 is of the push-button type normally biassed into the off condition. The source 23 is also connectible to the input of a monostable 25 by means of a switch 26 of similar type to the switch 24, the output pulses from the monostable 25 being used to operate the shutter 17. The output of the monostable 25 is also connected to the input of a two-stage binary counter 27, whose output is connected to the "reset" input of the flipflop 22 and also to a control line 28 of the monostable 25, the operation of the monostable 25 being inhibited when a signal appears on the line 28. The counter 27 has a "reset" line 29 connected to the output of the flipflop 21.

Video signals generated by the tube 9 are fed to the input of a bandpass filter 30, which may suitably have a passband of about 1.5–4 Mhz. The output of the filter 30 is fed to a detector 31 incorporating a full-wave rectifier, and the output of the detector 31 is applied to a storage device 32 incorporating a storage cathode ray tube which is scanned under the control of the synchronising signals produced by the generator 19. The device 32 normally operates in the "read" mode, but incorporates a trigger circuit which permits writing of the output of the detector 31 into the device 32, for a period equal to the duration of a small number of frames, on the application of a pulse of appropriate polarity to a "write" line 33; the line 33 is connected to the output of a differentiating circuit 34 whose input is connected to the output of the flipflop 21, the arrangement being such that a pulse of the appropriate polarity to operate the trigger circuit in the device 32 is applied to the line 33 at the end of each period during which the blanking circuit 20 is operated by the flipflop 21.

With the device 32 operating in the "read" mode, its contents are repeatedly used to generate a television picture by means of a conventional monitor 35 incorporating a cathode ray tube which is scanned under the control of the synchronising signals produced by the generator 19. The device 32 also has an "erase" line 36 which is connectible to the source 23 by means of a second pair of contacts of the switch 24.

The operation of the system for one cycle is thus as follows, it being assumed that any information relating to previous cycles has been erased from the screen 10 of the tube 9 by the normal scanning of the screen 10 prior to the start of the cycle under consideration. The cycle is initiated by operating the switch 24 to erase the contents of the device 32 and to set the flipflop 22. Shortly after the setting of the flipflop 22, the occurrence of a frame synchronising signal will cause operation of the flipflop 21, in turn causing scanning of the screen 10 to be inhibited; at the same time the counter 27 will be reset to zero, thus permitting operation of the monostable 25. The switch 26 is then operated twice to cause the screen 10 to be exposed successively to the required two patterns of illumination, the necessary wavelength change of course being made between the two operations of the switch 26; each operation of the switch 26 will cause the monostable 25 to generate a pulse which operates the shutter 17, the pulses being counted by the counter 27. The second operation of the switch 26 will thus cause the counter 27 to produce an output which inhibits further operation of the monostable 25 and also resets the flipflop 22. Shortly after the resetting of the flipflop 22, the next frame synchronising signal will cause the flipflop 21 to revert to its initial state, thus permitting scanning of the screen 10 to be resumed and allowing fresh information to be written into the device 32; it will be appreciated that the flipflop 21 is included in the system to ensure that the beginning and end of each period during which scanning of the screen 10 is inhibited will coincide with the beginning of a frame. The required video signal will thus be generated by the tube 9 during the first complete frame scan following the resumption of scanning, and a picture corresponding to the resultant signal then written into the device 32 will be displayed continuously by the monitor 35 until the next cycle is initiated.

The arrangement described above can be simplified if the interferometer shown in FIG. 1 is modified by replacing the source 2 with a coherent source capable of giving substantial outputs simultaneously at two wavelengths of sufficiently different values to ensure that light of one of the two wavelengths will not interfere with light of the other. This source might for example take the form of a dye laser having two resonant cavities respectively tuned to the two wavelengths; a suitable dye for use in such a laser would be that known as R6G. With this modification, two independent patterns of illumination are formed simultaneously on the screen 10, each pattern resulting from interference at the screen 10 between light of one of the two wavelengths scattered from the surface 6 and light of the same wavelength in the reference beam 5. For any given point on the screen 10, the intensities for the two patterns will of course be additive, so that one can in this case derive from the vidicon tube 9 a video signal representing the spatial variations of the sum $(I_1+I_2)$ simply by operating the tube 9 in the normal mode in which the screen 10 is scanned in a conventional raster on a continuous basis. With such an arrangement the shutter 17 can be omitted from the modified interferometer, and the tube 9 may for example be incorporated in a simplified version of the system shown in FIG. 3, in which the components 17, 21–27, 32 and 34 are omitted and the output of the detector 31 is fed directly to the monitor 35. It will commonly be desired to utilise pulsed operation of the coherent source, in which case the repetition frequency of the pulses should preferably be at least as high as the frame repetition frequency for scanning of the screen 10.

Figure 4:
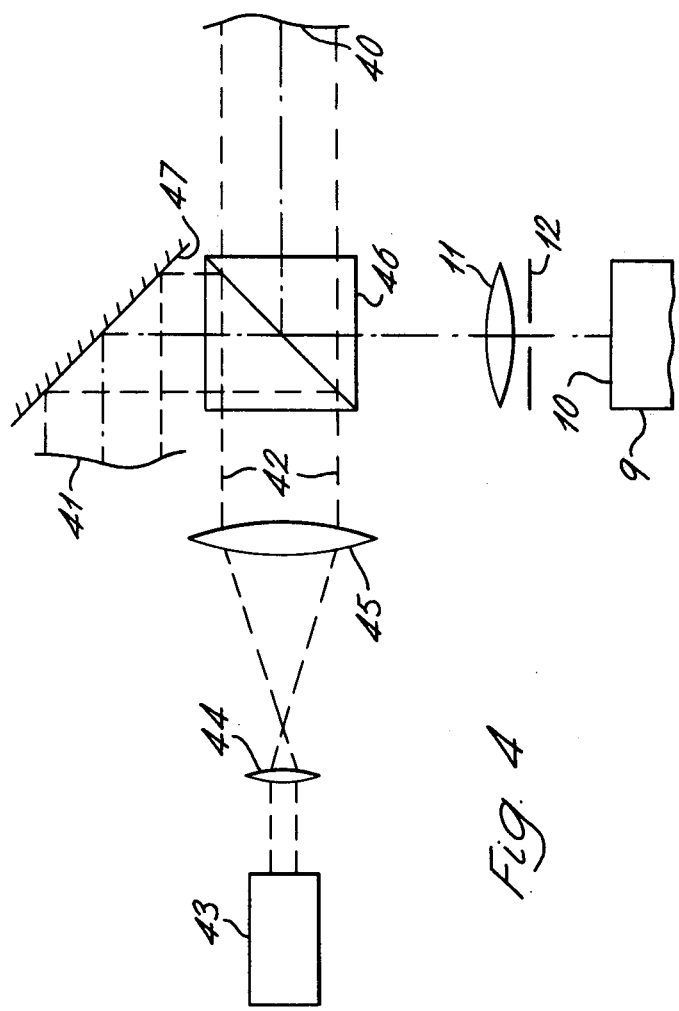
FIG. 4 is a diagram illustrating the principles of another form of interferometric system that may be used in arrangements according to the invention.

FIG. 4 illustrates the principles of an interferometric system which can be used in a method according to the invention applied to the comparison of two separate surfaces 40 and 41 of similar form; normally one of these surfaces will be a "master" surface against which the other surface is to be checked. In this system a collimated beam 42 of light is derived from a coherent source 43 which is capable of giving substantial outputs at two different wavelengths $\lambda_1$ and $\lambda_2$, the beam 42 being produced by expanding the original output beam from the source 43 by means of lenses 44 and 45. The beam 42 is split by a beam splitter 46, the light transmitted by the beam splitter 46 being arranged to illuminate the surface 40 directly, and the light reflected by the beam splitter 46 being arranged to illuminate the surface 41 after undergoing a further reflection by a mirror 47; the surfaces 40 and 41 are disposed as nearly as possible in optically equivalent positions relative to the beam splitter 46, and so as to be illuminated approximately at normal incidence. The surfaces 40 and 41 are arranged to be viewed simultaneously by a vidicon tube 9 having a photosensitive screen 10, an optical system similar to that shown in FIG. 1 being provided to image on the screen 10 light scattered from the surface 40 and reflected by the beam splitter 46 and light scattered from the surface 41, reflected by the mirror 47 and transmitted by the beam splitter 46. For each of the wavelengths $\lambda_1$ and $\lambda_2$, there will be superimposed at the screen 10 two speckle patterns derived respectively by virtue of light scattered from the surfaces 40 and 41, and it will be appreciated that the images of these surfaces are superimposed in the same sense by virtue of the presence of the mirror 47. If the general form of the surfaces 40 and 41 is symmetrical the mirror 47 can in fact be omitted, with the surface 41 resited to preserve the optical equivalence of the positions of the surfaces 40 and 41, since in this case it will not matter that the images of these surfaces are reversed relative to each other; a similar arrangement without the mirror 47 can also appropriately be used for the comparison of two surfaces whose general forms are mirror images of each other.

Depending on the nature of the source 43, the system can be used with the screen 10 illuminated either successively or simultaneously with light of the two wavelengths $\lambda_1$ and $\lambda_2$. Similar considerations to those discussed above apply to the methods of operation of the tube 9 respectively appropriate to these two cases for deriving a single video signal representing the spatial variations in the sum of the intensities in the two patterns of illumination formed on the screen by means of the light of the wavelengths $\lambda_1$ and $\lambda_2$, and to the choice of the values of $\lambda_1$ and $\lambda_2$ in the latter case; for example, where the two patterns of illumination are formed successively, the tube 9 may be incorporated in a system as shown in FIG. 3, a shutter (not shown) then being provided in the system shown in FIG. 4 to perform the same function as the shutter 17. In both cases, a television picture generated using the video signal derived from the tube 9 will exhibit a fringe pattern similar to that obtained with methods such as are described above for the inspection of a single surface. The fringe pattern will provide a contour map of the discrepancy, in the viewing direction, between the surfaces 40 and 41 at corresponding points of these surfaces, the dark lines representing positions where the discrepancy has a value of $(2N-1)\lambda_1\lambda_2/4(\lambda_1-\lambda_2)$.

I claim:

1. A method of optical inspection of a surface, the method comprising:
   forming two patterns of illumination independently on a photosensitive screen respectively by means of light of two different wavelengths, said patterns being formed in the same manner and each of them resulting from the irradiation of said screen with light derived from a coherent source and consisting of first and second interfering beams, said first beam for each of said patterns being constituted by light scattered from said surface and imaged on to said screen; and
   deriving from said screen a video signal representing the spatial variations in the sum of the intensities in said two patterns of illumination.

2. A method according to claim 1, further comprising processing said video signal to remove its d.c. component and then rectifying the resultant to provide a unidirectional signal.

3. A method according to claim 2, further comprising utilising said unidirectional signal as a picture signal to generate a television picture.

4. A method according to claim 1, in which said second beam for each of said patterns has a smooth wavefront.

5. A method according to claim 1, in which said second beam for each of said patterns is constituted by light scattered from a surface different from, but having a similar form to, said surface and imaged on to said screen in the same manner as for said first beam.

6. A method according to claim 1, in which said two patterns of illumination are formed successively on said screen, said screen having an integrating characteristic in respect of incident light.

7. A method according to claim 1, in which said two patterns of illumination are formed simultaneously on said screen.

8. An apparatus for use in optical inspection, the apparatus comprising:

a television camera device incorporating a photosensitive screen;

an optical system for imaging on to said screen light from surfaces viewed by said camera device;

means for causing, in respect of a surface viewed by said camera device, the formation independently on said screen, respectively by means of light of two different wavelengths, of two patterns of illumination which are formed in the same manner and each of which results from the irradiation of said screen with light derived from a coherent source and consisting of first and second interfering beams, said first beam for each of said patterns being constituted by light scattered from said surface and imaged on to said screen by said optical system; and means for operating said camera device to derive a video signal representing the spatial variations in the sum of the intensities in said two patterns of illumination.

9. An apparatus according to claim 8, further comprising means for processing said video signal to remove its d.c. component, and means for rectifying the resultant to provide a unidirectional signal.

10. An apparatus according to claim 9, further comprising means for utilising said unidirectional signal as a picture signal to generate a television picture.

11. An apparatus according to claim 8, in which said means for causing the formation of two patterns of illumination comprises means for causing said second beam for each of said patterns to have a smooth wavefront.

12. An apparatus according to claim 8, in which there are provided means for enabling said camera device to view two surfaces having a similar form simultaneously in a similar manner, and in which said means for causing the formation of two patterns of illumination comprises means for causing said interfering beams for each of said patterns to be constituted by light respectively scattered from said two surfaces and imaged on to said screen by said optical system.

13. An apparatus according to claim 8, in which said means for causing the formation of two patterns of illumination comprises means for causing said patterns to be formed successively, said screen having an integrating characteristic in respect of incident light.

14. An apparatus according to claim 8, in which said means for causing the formation of two patterns of illuminations comprises means for causing said patterns to be formed simultaneously.

* * * * *